(12) United States Patent
Manniso et al.

(10) Patent No.: US 12,257,114 B1
(45) Date of Patent: Mar. 25, 2025

(54) VACUUM LIGHT APPARATUS

(71) Applicants: Mark Manniso, Newark, DE (US); James B Eldon, Barto, PA (US)

(72) Inventors: Mark Manniso, Newark, DE (US); James Manniso, Newark, DE (US); James B Eldon, Barto, PA (US)

(73) Assignee: Forte Creates, LLC, Newark, DE (US)

(*) Notice: Subject to any disclaimer, the term of this patent is extended or adjusted under 35 U.S.C. 154(b) by 0 days.

(21) Appl. No.: 18/416,025

(22) Filed: Jan. 18, 2024

Related U.S. Application Data

(60) Provisional application No. 63/456,690, filed on Apr. 3, 2023.

(51) Int. Cl.
A61C 17/06 (2006.01)
A61C 17/08 (2006.01)

(52) U.S. Cl.
CPC ............ *A61C 17/084* (2019.05); *A61C 17/08* (2019.05); *A61C 2204/002* (2013.01)

(58) Field of Classification Search
CPC ....... A61C 17/06; A61C 17/08; A61C 17/084; A61C 1/0046; A61C 1/088
See application file for complete search history.

(56) References Cited

U.S. PATENT DOCUMENTS

| 3,052,031 | A | | 9/1962 | Piscitelli |
| 3,082,762 | A | | 3/1963 | Johann |
| 3,638,013 | A | | 1/1972 | Keller |
| 4,279,594 | A | | 7/1981 | Rigutto |
| 4,807,599 | A | | 2/1989 | Robinson et al. |
| 4,925,391 | A | | 5/1990 | Berlin |
| 4,931,015 | A | | 6/1990 | Amedei |
| 4,993,945 | A | | 2/1991 | Kimmelman et al. |
| 5,027,138 | A | | 6/1991 | Gandrud |
| 5,139,421 | A | | 8/1992 | Verderber |
| 5,457,611 | A | | 10/1995 | Verderber |
| 5,931,670 | A | * | 8/1999 | Davis .................... A61C 1/088 433/91 |
| 5,951,284 | A | | 9/1999 | Lake |
| 6,106,159 | A | | 8/2000 | Caplan et al. |
| 6,185,356 | B1 | * | 2/2001 | Parker ................ G02B 6/0036 362/559 |
| 6,443,729 | B1 | | 9/2002 | Watson |
| 6,544,036 | B1 | | 4/2003 | Brattesani |

(Continued)

FOREIGN PATENT DOCUMENTS

WO WO-9947068 A1 * 9/1999 ............. A61C 1/088

*Primary Examiner* — Edward Moran
(74) *Attorney, Agent, or Firm* — Invention To Patent Services; Alex Hobson

(57) ABSTRACT

A vacuum light apparatus is configured with a light source that illuminates a light pipe forming a light pipe conduit configured to draw vacuum therethrough. The vacuum light apparatus has a light switch to turn the light source on and off, dim up and down and a vacuum actuator to adjust the amount of vacuum on the projection end of the light pipe. The light source may receive power from a battery, or from a power cable. The power cable may be detachably attached to the vacuum light apparatus, such as to the body. An exemplary vacuum light apparatus may be used for dental applications to provide illumination in an oral cavity or mouth while providing suction to draw away saliva, other fluids and particles from the procedure.

10 Claims, 5 Drawing Sheets

(56) References Cited

U.S. PATENT DOCUMENTS

| | | |
|---|---|---|
| 6,575,744 B1 | 6/2003 | Oshida |
| 6,702,577 B2 | 3/2004 | Wong |
| 6,867,864 B2 | 3/2005 | Overbeck et al. |
| 7,331,785 B2 | 2/2008 | Croop et al. |
| 8,088,066 B2 | 1/2012 | Grey et al. |
| 8,172,571 B2 | 5/2012 | Watson |
| 8,282,393 B2 | 10/2012 | Widen |
| 8,684,577 B2 | 4/2014 | Vayser |
| 9,629,533 B2 * | 4/2017 | Watson ............... A61B 1/00165 |
| 10,206,564 B2 | 2/2019 | Watson et al. |
| 2002/0118279 A1 | 8/2002 | Spoonhower et al. |
| 2003/0207229 A1 | 11/2003 | Wong |
| 2010/0190129 A1 * | 7/2010 | Paz ........................ A61C 1/088 |
| | | 433/29 |
| 2012/0021373 A1 | 1/2012 | Moreno |
| 2024/0293210 A1 * | 9/2024 | Uji ......................... A61C 17/08 |

* cited by examiner

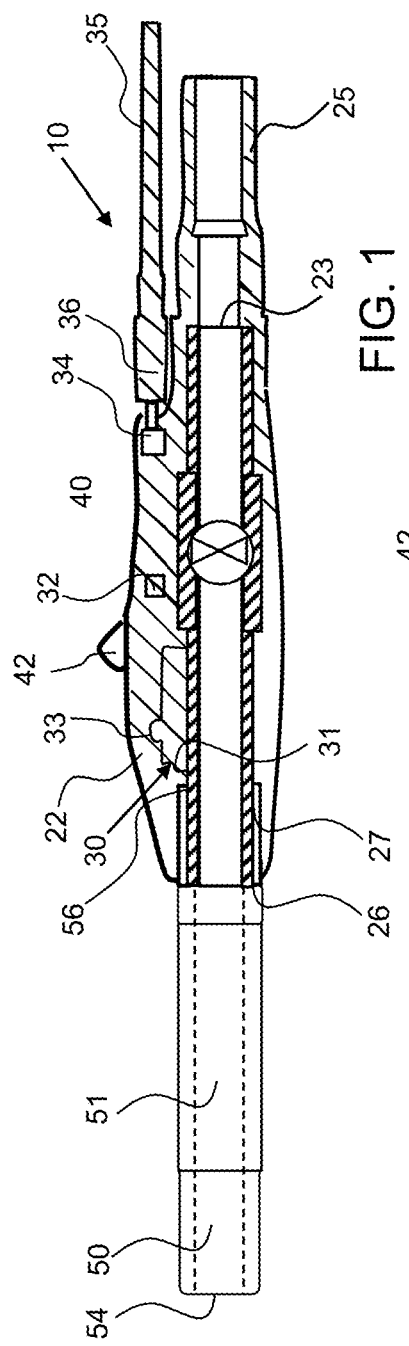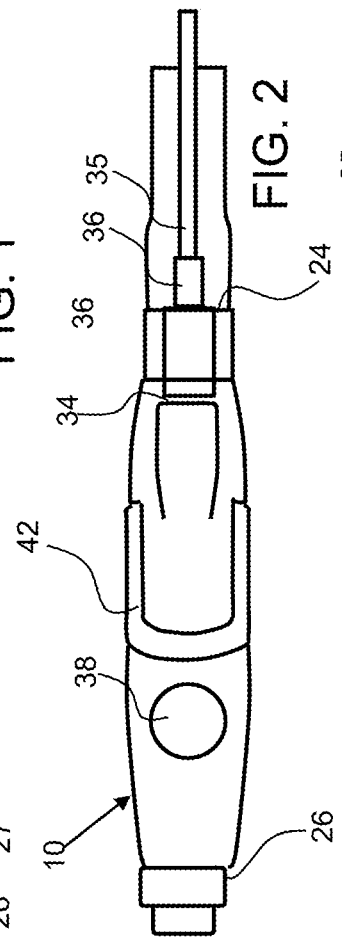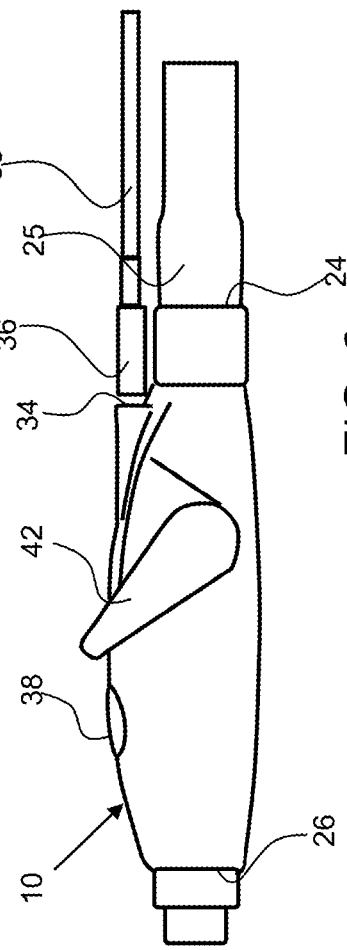

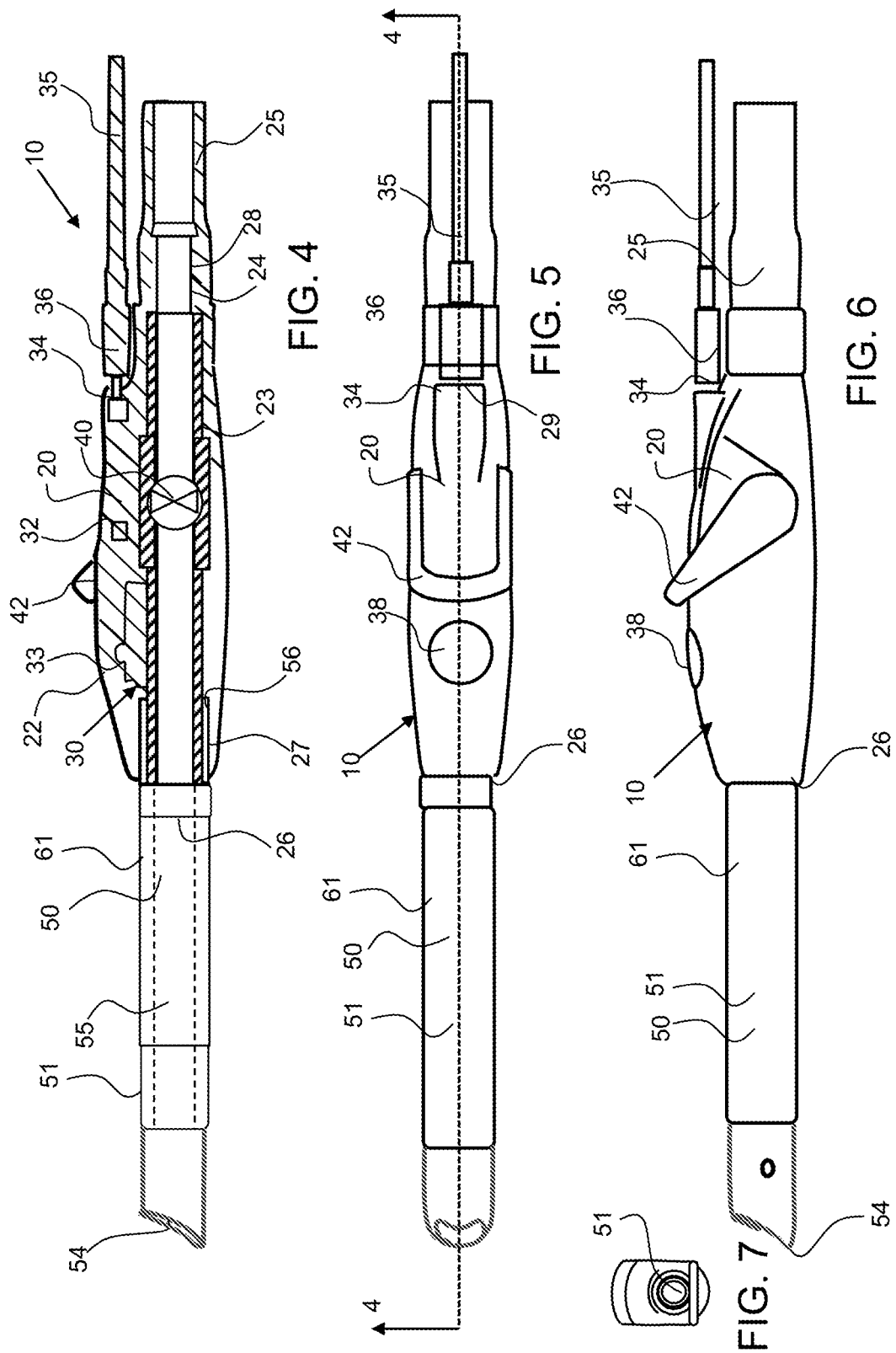

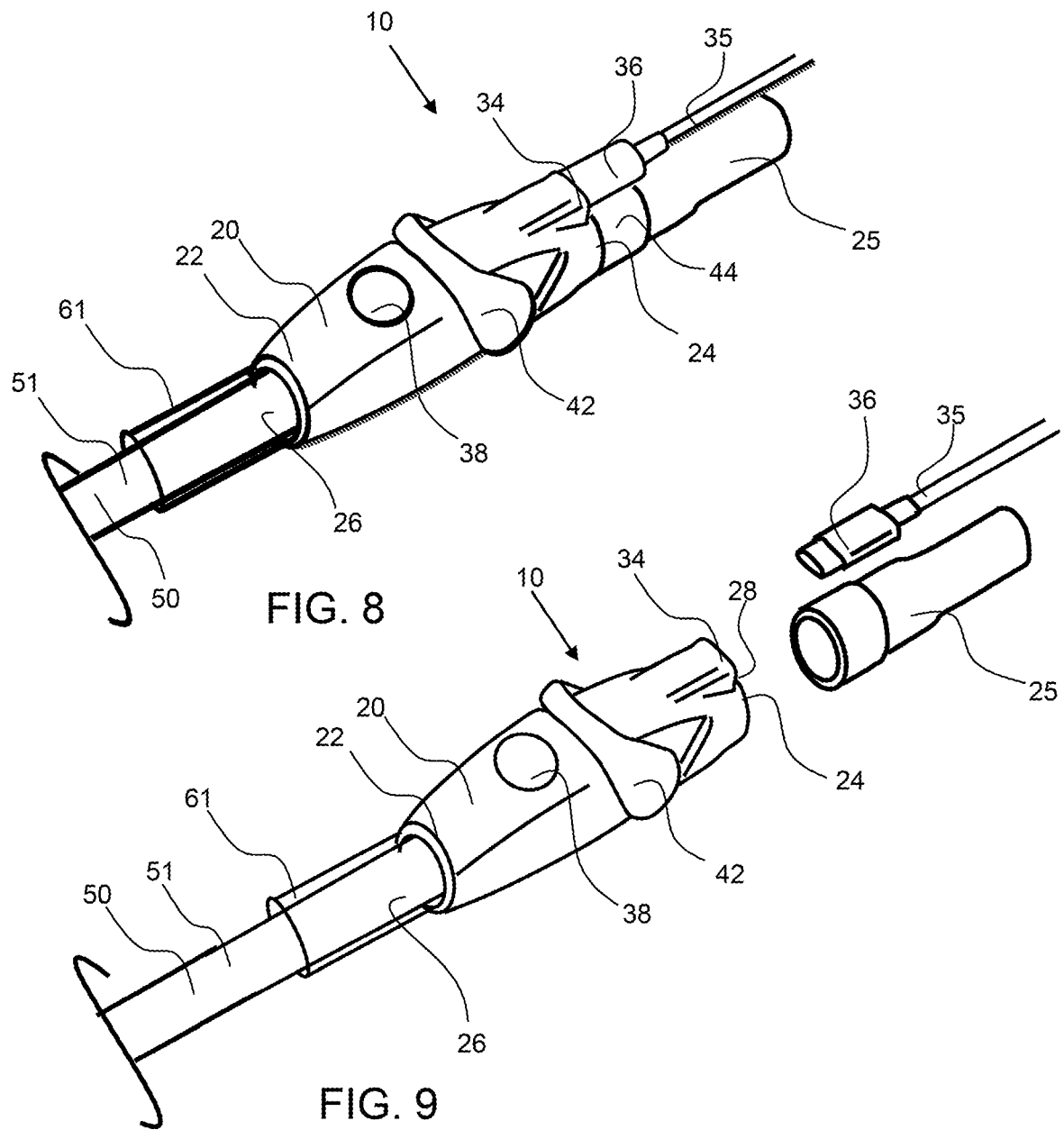

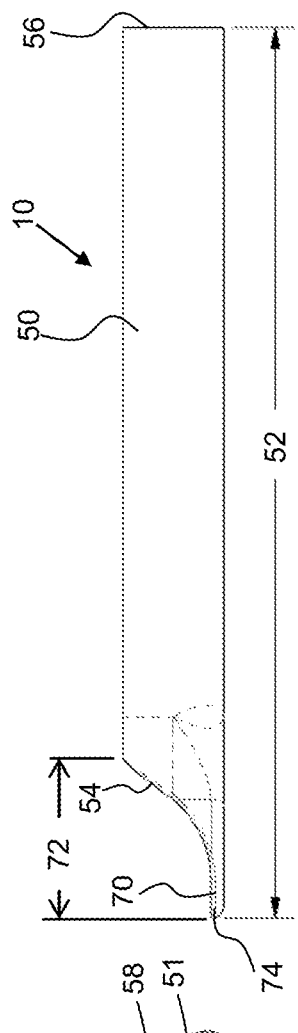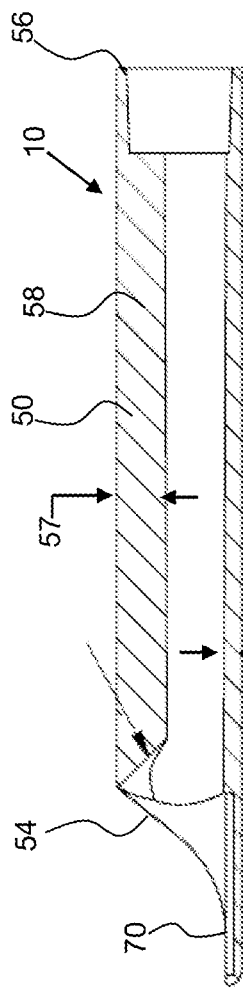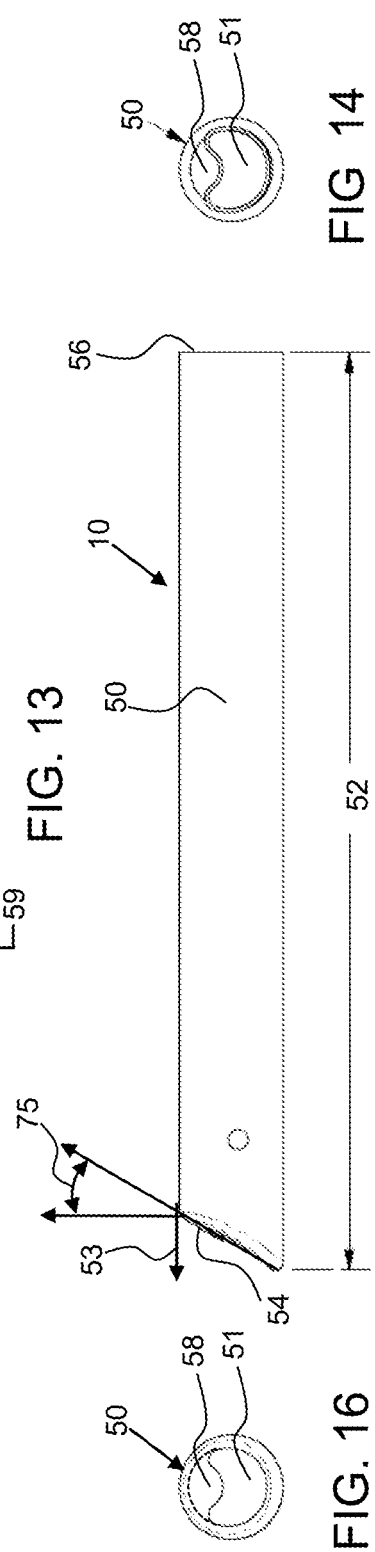

VACUUM LIGHT APPARATUS

CROSS REFERENCE TO RELATED APPLICATIONS

This application claims the benefit of priority to U.S. provisional Patent application No. 63/456,690, filed on Apr. 3, 2023; the entirety of which is hereby incorporated by reference herein.

BACKGROUND OF THE INVENTION

Field of the Invention

The invention relates to a vacuum light apparatus configured with a light source that illuminates a light pipe forming a light pipe conduit configured to draw vacuum therethrough primarily for dental applications.

Background

Over 300 million dental procedures were performed in the US in 2019. Historically, the dental operatory has always put patients, dentists, and staff at greater environmental risk because of airborne flora and infection aerosolized into the environment. There exists a need for a way to positively remove debris, particle and bodily fluid during dental procedures to help mitigate or reduce the possibility of choke, gag, aspiration and ingestion. Also, the oral cavity or mouth is dark which makes it difficult for dental assistants, dental hygienist and dentists to effectively see within the oral cavity.

SUMMARY OF THE INVENTION

The invention is directed to an illuminating and vacuuming, high volume evacuation (HVE) dental handpiece designed primarily for Dental Assistant and Dental Hygienists. The vacuum light apparatus increases infection control for dental teams and patients by reducing dangerous bio-aerosol plumes, airborne infection, and dental environmental hazards as light and vacuum together provide clinicians more illumination to evacuate dangerous splatter and plumes. Additionally, the high value illumination provided from the vacuum light apparatus helps protect patients from gag, choke, aspiration and ingestion hazards common in every day operative and restorative dentistry. The vacuum light apparatus delivers increased visibility that will aid evacuation of saliva, debris and foreign objects, by using a clear, single-use illuminating large bore light pipe, or cannula. This optically clear, illuminating vacuuming light pipe is both a light tube and a vacuum tube. As such, the illumination at the vacuuming tip helps protect patients and environments together. Lastly, vacuum light apparatus can also aid practitioners by reducing the ergonomic impacts of neck, back and eye pain and strain brought on by repetitive motion of bending and craning and directing light into the oral cavity via overhead dental lights or headlamps constantly adjusted to aid Dental Assistants and Dental Hygienists to see better. This invention gives these dental practitioners an independent light source, they control to deliver effective light and vacuum to protect patients from choking or gagging, and the dental teams and patients from air born infectious matter.

An exemplary vacuum light apparatus is configured with a light source that illuminates a light pipe forming a light pipe conduit configured to draw vacuum therethrough. An exemplary vacuum light apparatus has a light switch to turn the light source on and off, dim up and down and a vacuum actuator, such as a valve lever, may be configured to open and close the vacuum valve to adjust the amount of vacuum on the projection end of the light pipe. The light source may receive power from a battery, or from a power cable. The power cable may be detachably attached to the vacuum light apparatus, such as to the body. The power cable may have a power cable connector that is configured to couple with a power connector of the body. The power cable connector and power connector of the body may be Universal Serial Port (USB) type connectors. Also, the power cable may provide power to the light source and may also charge the battery, wherein the battery is a rechargeable battery.

A vacuum tube may also be detachably attached to the vacuum light apparatus, such as to the coupler end of the body, and may extend to a vacuum source that produces vacuum in said vacuum tube. The body may have a vacuum hose coupler configured to receive the vacuum hose thereon to detachably attach the vacuum hose. An exemplary vacuum light apparatus may be used for dental applications to provide illumination in an oral cavity or mouth while providing suction to draw away saliva, other fluids and particles from the procedure. The light pipe may have an opaque cover over a portion of the light pipe leaving the projection end uncovered for illumination of the oral cavity. Also, the light pipe may have a light pipe flange that extends outward from the projection end of the light pipe that may be used for isolation and retraction of the tongue or cheek wall, and may also be used to shield the clinician from spray and aerosol formed from the procedure. The light pipe flange may extend a length from the projection end to an extended end that is about 5 mm or more, about 7.5 mm or more, about 10 mm or more, about 15 mm or more, about 20 mm or more, about 25 mm or more and any range between and including the values provided.

A light source, such as a light emitting diode (LED), produces light that is transmitted along or through the light pipe from the body end of the light pipe to the projection end of the light pipe. The light pipe forms a light pipe conduit that enables a flow of fluid and particles or solid material to flow through the light pipe. The light may be transmitted through the light pipe wall that forms the light pipe conduit and also through a light transfer protrusion, a protrusion that extends radially inward from the light pipe conduit wall. The light pipe conduit may extend in a radius of curvature along a portion of the interior of the light pipe conduit and the light transfer protrusion may extend radially inward from the radius of curvature. The light transfer protrusion may enable a much greater amount of light to be transferred from the light source down along the light pipe to the projection end for increased and enhanced illumination. The light transfer protrusion may have an exterior surface that also extends in a radius of curvature and this radius of curvature may be less than that of the interior wall of the light pipe conduit. For example, the radius of curvature of the light transfer protrusion may be a percentage of the radius of curvature of the interior wall of the light pipe conduit, such as about 90% or less, about 80% or less, about 70% or less, about 50% or less, about 30% or less and any range between and including the percentages provided. An exemplary light transfer protrusion may occupy a portion of the cross-sectional area of the otherwise circular light pipe conduit, such as about 20% or more, about 30% or more, about 40% or more, about 50% or more and any range between and including the percentages provided.

The light pipe may be detachably attachable to the body of the vacuum light apparatus and may be configured to be inserted into a orifice of the body to engage with the light source, such as an LED light.

The body may have an opaque cover that extends around the light pipe to prevent the light from projecting out from around the body and to help collimate light.

The vacuum is produced by a vacuum source that produces a vacuum in the vacuum hose. The vacuum hose connected to the vacuum light apparatus produces suction with the body conduit. This suction can be used to remove bodily fluids, debris and the like during a dental procedure, such as operative or restorative dentistry or a dental cleaning. A plurality of light pipes having different lengths and geometries of light pipe flanges may be provided with the vacuum light apparatus system depending on the type of procedure and the size of the patient. A longer light pipe with a long light pipe flange may be used for dental cleaning to provide effective shielding of spray and aerosol.

An exemplary vacuum light apparatus has a vacuum hose and power cable detachably attachable to the body of the vacuum light apparatus. The power cable may have a power cable connector or connection with the power connector on the body, which may be a Universal Serial Port (USB) connector. The vacuum hose may have a connector for connecting to the vacuum hose coupler on the coupler end of the body.

A vacuum valve may be a vacuum valve lever that opens and closes by rotation or pivoting to change the amount of flow or vacuum at the projection end of the light pipe. A clinician may rotate the vacuum valve lever to increase or decrease or even eliminate the vacuum within the light pipe conduit.

A light switch may be a button on the body of the vacuum light apparatus that may be pushed to turn on the light source and pushed again to turn off the light source. In an exemplary embodiment, the amount of light or lumens may be adjusted by pressing the light switch. A first press of the light switch when in an off position may result in a first intensity or lumens of light and a subsequent pressing of the light switch may reduce or increase the intensity of light by at least 10% or at least about 20% or even at least about 40%. Successive pressing of the light switch may continue to change the light intensity or lumens until the light source is again switched off.

An exemplary vacuum light apparatus may increase infection control for Dentists, Dental Assistants, Hygienists, and Patients by reducing airborne infection, bio-aerosol plumes and dental environmental hazards. Additionally, the high value illumination provided by a vacuum light apparatus can protect patients from gagging and choking hazards common in operative dentistry. A vacuum light apparatus may give Dental Practioners, but especially Dental Assistants increased visibility that will aid evacuation of saliva and debris using our clear, Single-Use Illuminating large bore cannula. This optically clear, vacuum light apparatus may be a single use illuminating vacuuming cannula that is both a light tube or light producing apparatus and a vacuuming tube. As such, the illumination at the vacuuming tip protects patients and environment together. A vacuum light apparatus can also aid Dental Assistants and Hygienists by reducing the damaging ergonomic impacts brought by repetitive motion and bending to see and direct light which injures backs, necks, joints and eyes.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 1 shows a cross sectional view of the vacuum light apparatus along line 1-1 of FIG. 2.

FIG. 2 shows a top view of an exemplary vacuum light apparatus having a light switch to turn the light on and off and a vacuum valve lever to open and close the vacuum valve.

FIG. 3 shows a side view of the exemplary vacuum light apparatus shown in FIG. 2.

FIG. 4 shows a cross sectional view of the vacuum light apparatus along line 4-4 of FIG. 5.

FIG. 5 show a top view of the exemplary vacuum light apparatus shown in FIG. 4 with a light mirror attachment detachably attached to the suction end.

FIG. 6 shows a side view of the exemplary vacuum light apparatus shown in FIG. 5.

FIG. 7 shows an end view of the exemplary vacuum light apparatus shown in FIG. 6.

FIG. 8 shows a perspective view of an exemplary vacuum light apparatus having a vacuum hose and power cable attached.

FIG. 9 shows a perspective view of the exemplary vacuum light apparatus shown in FIG. 8 with the vacuum hose and power cable detached from the body of the vacuum light apparatus.

FIG. 10 shows a body end view of an exemplary vacuum light apparatus having a light transfer protrusion extending into the light pipe conduit.

FIG. 11 shows a side view of the exemplary vacuum light apparatus shown in FIG. 10.

FIG. 12 shows a projection end view of the exemplary vacuum light apparatus shown in FIG. 10.

FIG. 13 shows a cross section view of the exemplary vacuum light apparatus shown in FIG. 11.

FIG. 14 shows a body end view of an exemplary vacuum light apparatus having a light transfer protrusion extending into the light pipe conduit.

FIG. 15 shows a side view of the exemplary vacuum light apparatus shown in FIG. 14.

FIG. 16 shows a projection end view of the exemplary vacuum light apparatus shown in FIG. 14.

Figure 17:
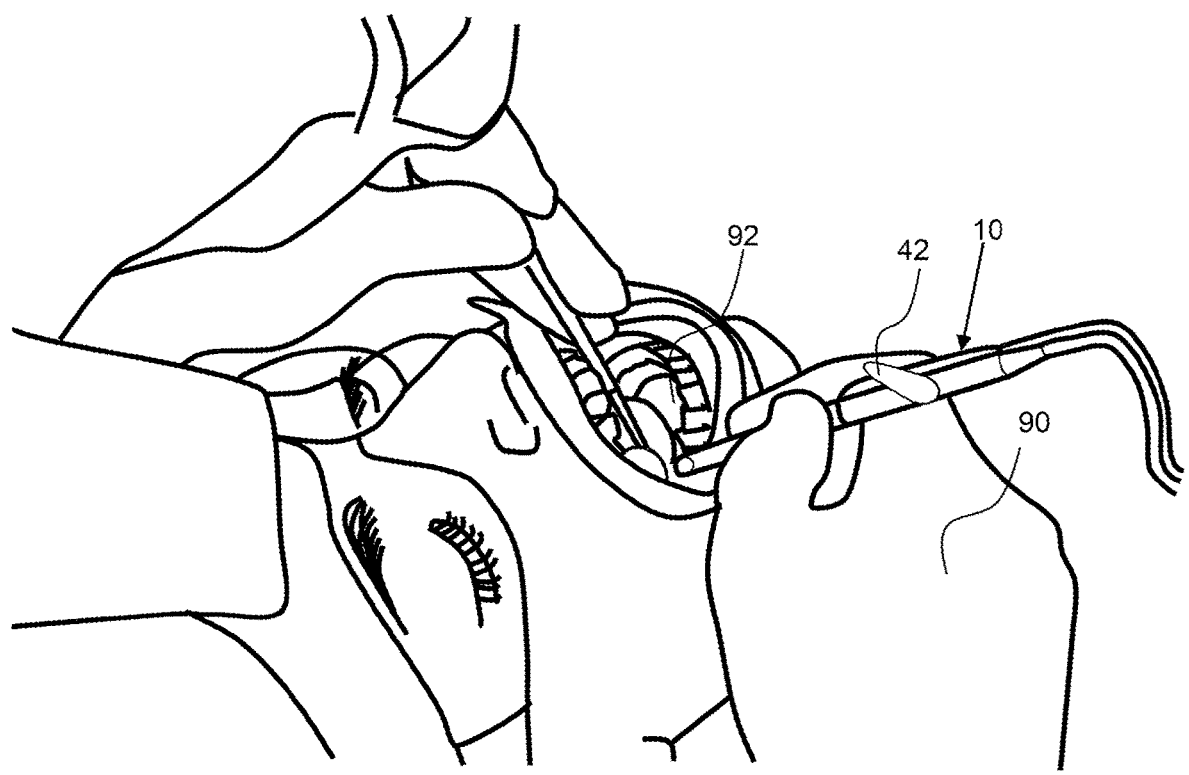
FIG. 17 shows a prospective view of an exemplary vacuum light apparatus being used to illuminate an oral cavity while also drawing fluid an particle out of the oral cavity.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Referring now to FIGS. 1 to 7, an exemplary vacuum light apparatus 10 has a light switch 38 to turn the light source 30 on and off, and may change the intensity of the emitted light from the light source, and a vacuum valve lever 42 to open and close the vacuum valve 40 configured to open and close the body conduit 23 extending through the body 20. A vacuum valve lever 42 is configured for manual interface to open and close the vacuum valve 40. The light source 30, which may be a light emitting diode 31 (LED), may receive power from a battery 32, or from a power cable 35, such as a USB cable to produce projected light 55. The power cable has a power cable connector 36 that detachably attaches to the power connector 34, such as a universal serial port 29 (USB) connector, on the body 20 of the vacuum light apparatus 10. A vacuum hose 25 is coupled to the coupler end 24 of the body 20 by the vacuum hose coupler 28 (shown in FIG. 9) to provide suction through the light pipe 50 to produce suction on the suction end 26 of the body 20.

A light source 30, such as a LED, produces light that is transmitted along the light pipe 50 to the projection end 54 of the light pipe 50, as shown in FIG. 1. The light pipe 50 is detached from the body 20 in FIGS. 2 and 3. The light pipe may extend from a body end 56 to the projection end 54. The light pipe 50 forms a light pipe conduit 51 and may extend a substantial portion of the body conduit 23 of the body 20 and may extend the entire length of the conduit of the body. The body may have an opaque cover 22 that extend around the light pipe to prevent the light from projecting out from around the body.

The vacuum is produced by a vacuum source (not shown) that produces a vacuum in the vacuum hose 25. The vacuum hose connected to the vacuum light apparatus 10 produces suction on the suction end 26 of the body 20. This suction can be used to remove bodily fluids, debris and the like during a dental procedure, such as a dental cleaning. Attachments may be detachably attached to the suction end to enable reach into smaller oral cavities, for example.

As shown in FIGS. 1 and 4, a controller 33 may be configured to control the light intensity of the light source 30 from the input to the light switch 38. Also, a light pipe orifice 27 in the body 20 may be configured to receive the light pipe 50 therein. The body end 56 of the light pipe 50 may be inserted into the light pipe orifice 27 to locate the body end 56 proximal to the light source 30.

As shown in FIGS. 8 and 9, the exemplary vacuum light apparatus 10 has a vacuum hose 25 and power cable 35 detachably attachable to the body 20 of the vacuum light apparatus 10. In FIG. 9, the vacuum hose 25 and power cable 35 are detached. The power cable 35 has a power cable connector 36 for connecting with the power connector 34 on the body 20. The vacuum hose 25 may have a vacuum hose connector 44 for connecting to the vacuum hose coupler 28 on the coupler end 24 of the body. An attachment 80 is coupled to the suction end 26 of the body 20. The vacuum valve lever 42 may be used to control the amount of suction on the projection end of the light pipe. The light pipe 50 may have an opaque cover 61 over a portion of the light pipe leaving the projection end uncovered for illumination of the oral cavity.

Referring now to FIGS. 10 to 16, an exemplary vacuum light apparatus 10 utilizes a light pipe 50 that transfers light from a body end 56 to a projection end 54. The light pipe 50 shown in FIGS. 10 to 13 has a light pipe flange 70 that extends from the projection end 54 and may be configured to direct fluid and particles into the light pipe conduit. The light pipe flange 70 may be used to shield spray of water or other fluids during a dental procedure. The light pipe flange 70 has a length 72 from the projection end 54 of the light pipe 50 to an extended end 74.

The light pipe 50 is configured to transmit an effective amount of light from the body end 56 to the projection end 54 and incorporates a light transfer protrusion 58 that protrudes into the otherwise circular shaped light pipe conduit 51. The light transfer protrusion is an integral part of the light pipe that extends inward into a cross sectional area of the light pipe conduit, as shown in FIGS. 10, 12, 14, and 16. The light transfer protrusion 58 may have a curved outer surface to aid in the flow of liquid and debris up along the light pipe conduit 51. As shown, the light transfer protrusion 58 has an outer surface within the light pipe conduit 51 that extends along a radius of curvature that is less than the diameter of the light pipe conduit 51. As described herein, the light transfer protrusion may occupy a portion of the volume of the otherwise circular light pipe conduit, such as about 20% or more, about 30% or more, about 40% or more or even about 50% or more, and any range between and including the percentages provided. A dashed line in FIGS. 12 and 16 is used to show the diameter of the light pipe conduit 51 and therefore more clearly show the volume of the otherwise circular light pipe conduit occupied by the light transfer protrusion 58.

As shown in FIG. 13, the wall thickness 57 of the light transfer protrusion 58 is much greater than the wall thickness 59 of the light pipe 50 opposite the light pipe protrusion 58. Again, this increased wall thickness and geometry enables a high and effective amount of light to be transferred down the light pipe 50.

As shown in FIGS. 14 to 16, the light pipe 50 has projection end 54 with an offset angle 75 from orthogonal to a length axis of 53 of the light pipe conduit 51 that may be about 10 degrees or more, about 15 degrees or more, about 25 degrees or more, about 45 degrees or more, about 60 degrees or more, and any range between and including the offset angle values provided. This offset angle may enable better manipulation an access to the oral cavity and tighter locations in the oral cavity. The higher the offset angle, the more pointed and narrow the projection end is.

As shown in FIG. 17, a clinician 90 is using an exemplary vacuum light apparatus 10 to illuminate an oral cavity 92 and reduce spray and aerosol from escaping the oral cavity. The clinician may use the vacuum valve lever to adjust the amount of vacuum during the procedure.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A vacuum light apparatus comprising:
   a) a body having a body conduit extending from a coupler end to a suction end of the body conduit;
      wherein the body comprises a power connector;
   b) light emitting diode configured within the body and configured to produce light;
   c) a light pipe extending from the suction end of the body and configured to project said light from the light emitting diode to a projection end of the light pipe, said light pipe consisting of
      i) a light pipe conduit extending from the projection end of the light pipe to a body end of the light pipe, said body end proximal to the light emitting diode to receive said light from the light emitting diode;
      ii) a light transfer protrusion extending along the light pipe conduit from said projection end to said body end;
   wherein the light pipe is detachably attachable from the said body;
   wherein the light pipe forms said light pipe conduit that enables a flow of fluid to flow through the light pipe conduit;
   wherein the light transfer protrusion is an integral part of the light pipe conduit, and wherein the light transfer protrusion is formed by a thickening of a wall of the light pipe conduit, such that a wall thickness of the light pipe conduit along the light transfer protrusion is greater than a wall thickness of the light pipe conduit opposite the light transfer protrusion;
   wherein the light transfer protrusion forms a portion of an interior wall of the light pipe conduit;
   wherein the light transfer protrusion has an exterior wall forming a portion of the interior wall of the light pipe conduit; and
   wherein the light transfer protrusion extends inward into a cross sectional area of the light pipe conduit;
   d) a light switch configured on said body to turn the light emitting diode on and off; wherein the light switch is operable to change an intensity of light from said light emitting diode;
   e) a vacuum valve configured to open and close the body conduit; and
   f) a vacuum valve lever coupled with the vacuum valve and configured to open and close the vacuum valve;
   g) a vacuum hose; and
   h) a power cable configured to detachably attach to the body to provide power to the light emitting diode;
   wherein the power cable comprises a power cable connector configured to couple with said power connector of the body;
   wherein said vacuum hose is coupled to the coupler end of the body to produce vacuum in the body conduit and at the suction end of the body; and wherein with the vacuum valve open, air flows through the light pipe conduit to the suction end of the body conduit and through the body conduit to the coupler end of the body conduit.

2. The vacuum light apparatus of claim 1, wherein the vacuum hose is detachably attachable to the coupler end of the body.

3. The vacuum light apparatus of claim 2, further comprising a battery configured in the body to power the light emitting diode.

4. The vacuum light apparatus of claim 1, wherein the power connector is a Universal Serial Port (USB) connector.

5. The vacuum light apparatus of claim 1, wherein the power cable connector is a Universal Serial Port (USB) connector.

6. The vacuum light apparatus of claim 5, further comprising a battery configured in the body to power the light emitting diode.

7. The vacuum light apparatus of claim 6, wherein the battery is a rechargeable battery and wherein the power cable is configured to recharge said rechargeable battery.

8. The vacuum light apparatus of claim 1, wherein the light transfer protrusion extends along a radius of curvature.

9. The vacuum light apparatus of claim 8, wherein the radius of curvature of the light transfer protrusion is no more than 80% of the radius of curvature of the interior wall of the light pipe conduit.

10. The vacuum light apparatus of claim 1, wherein the projection end of the light pipe extends at an offset angle from orthogonal to a length axis of the light pipe conduit between 10 degrees and 60 degrees.

* * * * *